United States Patent [19]
De Luca et al.

[11] Patent Number: 4,722,702
[45] Date of Patent: Feb. 2, 1988

[54] HIGH DENSITY FRONT ADMINISTERED PROTECTOR BLOCK

[75] Inventors: Paul V. De Luca, Plandome Manor; Michael Fasano, Syosset; Albert Atun, Valley Stream, all of N.Y.

[73] Assignee: Porta Systems Corp., Syosset, N.Y.

[21] Appl. No.: 387,926

[22] Filed: Jun. 14, 1982

[51] Int. Cl.⁴ .............................................. H01R 9/24
[52] U.S. Cl. .................................... 439/718; 439/922
[58] Field of Search ................. 339/18 R, 18 C, 97 R, 339/97 P, 98, 99 R, 198 R, 198 S, 198 P, 198 J; 361/110, 111, 118, 119, 428; 439/43, 49, 54, 709, 712, 713, 715, 718–722, 922

[56] References Cited
U.S. PATENT DOCUMENTS

| | | | |
|---|---|---|---|
| 4,037,910 | 7/1977 | Paluch | 339/198 R |
| 4,057,692 | 11/1977 | DeBortoli et al. | 339/18 R |
| 4,179,170 | 12/1979 | Splitt et al. | 339/198 R |

Primary Examiner—Gil Weidenfeld
Assistant Examiner—Gary F. Paumen
Attorney, Agent, or Firm—Charles E. Temko

[57] ABSTRACT

A high density front administered telephone protector block having three terminal connection surfaces disposed on three sides of the block. The block is mounted on an inner end by a rearwardly extending bracket. A first side surface mounts protector modules, an oppositely disposed second side surface mounts outside plant wire wrap pins for connecting subscriber pairs. A third outer end surface extends transversely past the side surface and mounts quick clip terminals for cross connections.

1 Claim, 4 Drawing Figures

HIGH DENSITY FRONT ADMINISTERED PROTECTOR BLOCK

BACKGROUND OF THE INVENTION

This invention relates generally to the field of telephony, and more particularly to an improved high density protector block used to terminate subscriber pairs within a telephone office.

As is known in the art, incoming subscriber pairs are customarily terminated with a telephone office on protector blocks which include means for connecting of replaceable connector modules, one for each pair. Cross connections are made from the protector blocks to office switching and other equipment. Should excess voltage or current surges occur on the subscriber pairs, the protector modules prevent passage of the same to office equipment, thereby preventing damage.

A large number of main frame arrangements have been used in the telephone industry over many years. The principal problem in main frame and protector block design is usually one of available space utilization. With continuous growth in the number of subscribers, each new telephone office must be ordered to provide for the accommodation of as many subscriber lines as possible per given square foot of office space. To this end, some designs include main frames that provide one section on one side thereof, and pin connectors on an opposite side. Other frame designs offer both protection and pin connection on the same side in different areas. Still others have wire wrap pins positioned externally at an angle, and protector module accommodation perpendicular to a central surface of the block. all of the above arrangements must provide for cross connections within the telephone office in addition to outside plant and protector module connection.

SUMMARY OF THE INVENTION

Briefly stated, the invention contemplates the provision of an improved high density front administered protector block suitable for use when access is available on three sides. This is most conveniently accomplished by providing for the mounting of the block from an inwardly facing surface to project outwardly of the frame into an adjacent aisle, and spacing the blocks such that access can be made to the side surfaces thereof.

To this end, the disclosed construction contemplates a block of generally "T" shaped horizontal cross section, in which the main leg of the "T" provides wire wrap pins on one side surface thereof, and provision for mounting corresponding protector modules on an opposite side thereof. The cross bar of the "T" has an outwardly facing surface which mounts a corresponding number of quick clip connectors of wire insulation displacing type for attaching cross connections. The wire wrap pins and protector modules are disposed behind the cross connection area, and are particularly shielded thereby. A transversely extending rear wall provides for the mounting of the block using a bracket, and defines a forwardly facing recess cooperating with a rearwardly facing recess in the transversely extending front wall for the accommodation of a protective sheet which overlies the wire wrap terminals.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
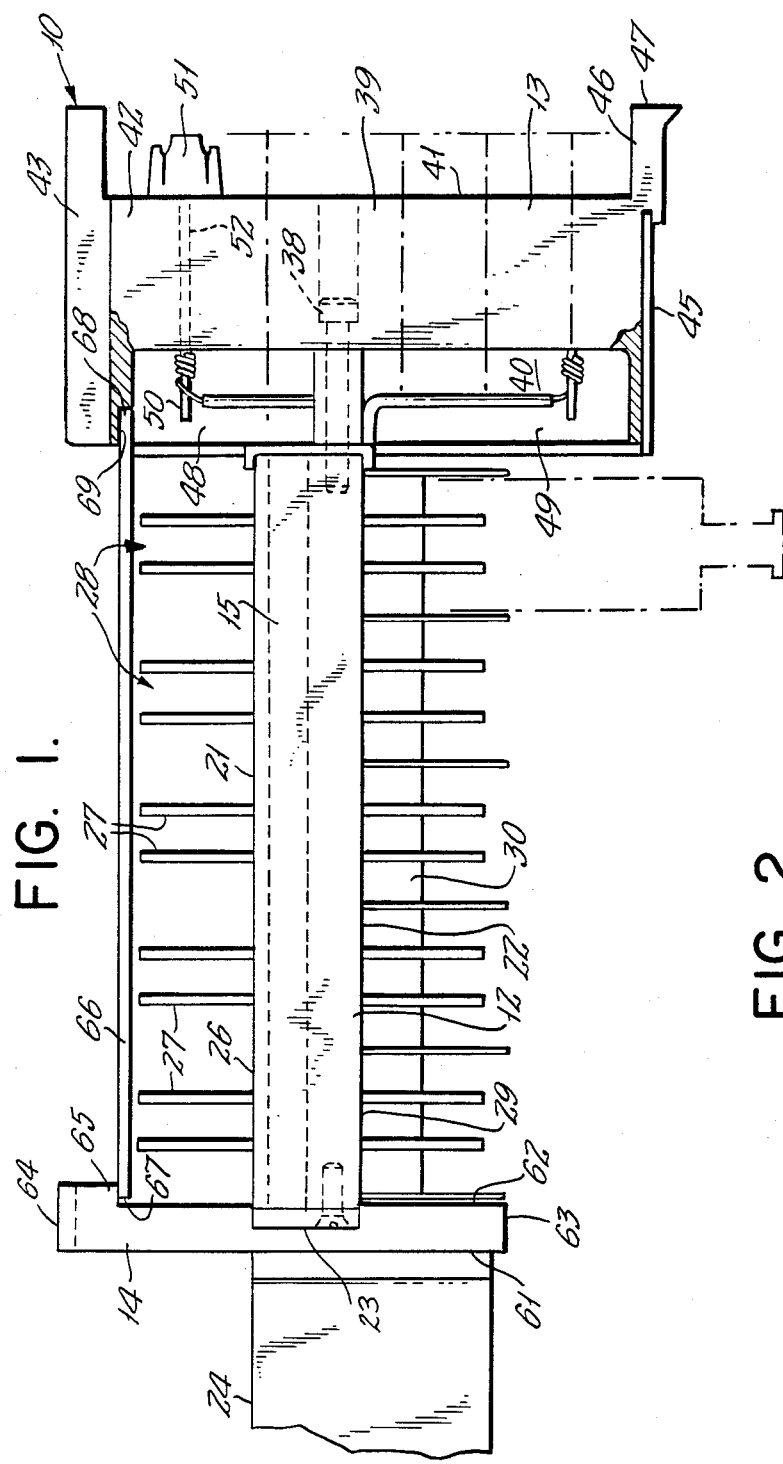
FIG. 1 is a top plan view of an embodiment of the invention.
Figure 2:
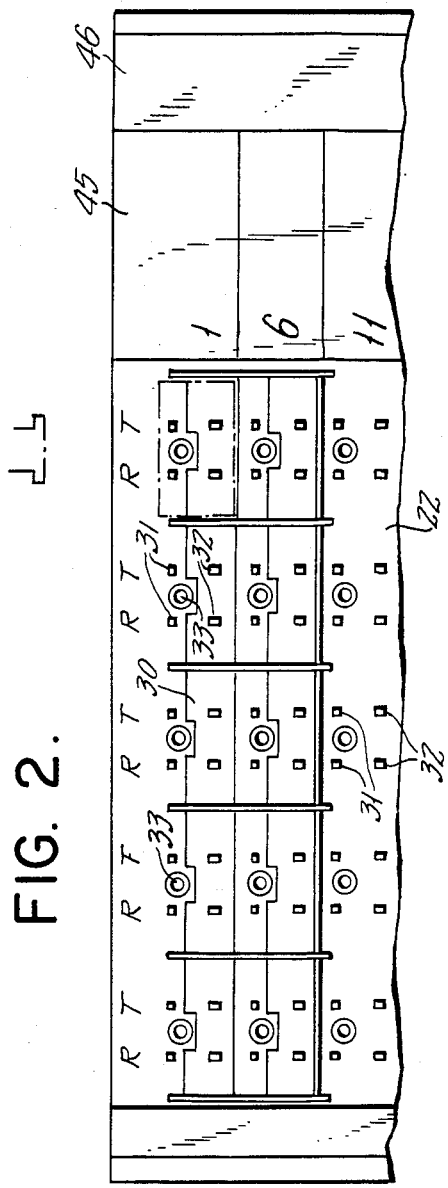
FIG. 2 is a side elevational view thereof.
Figure 3:
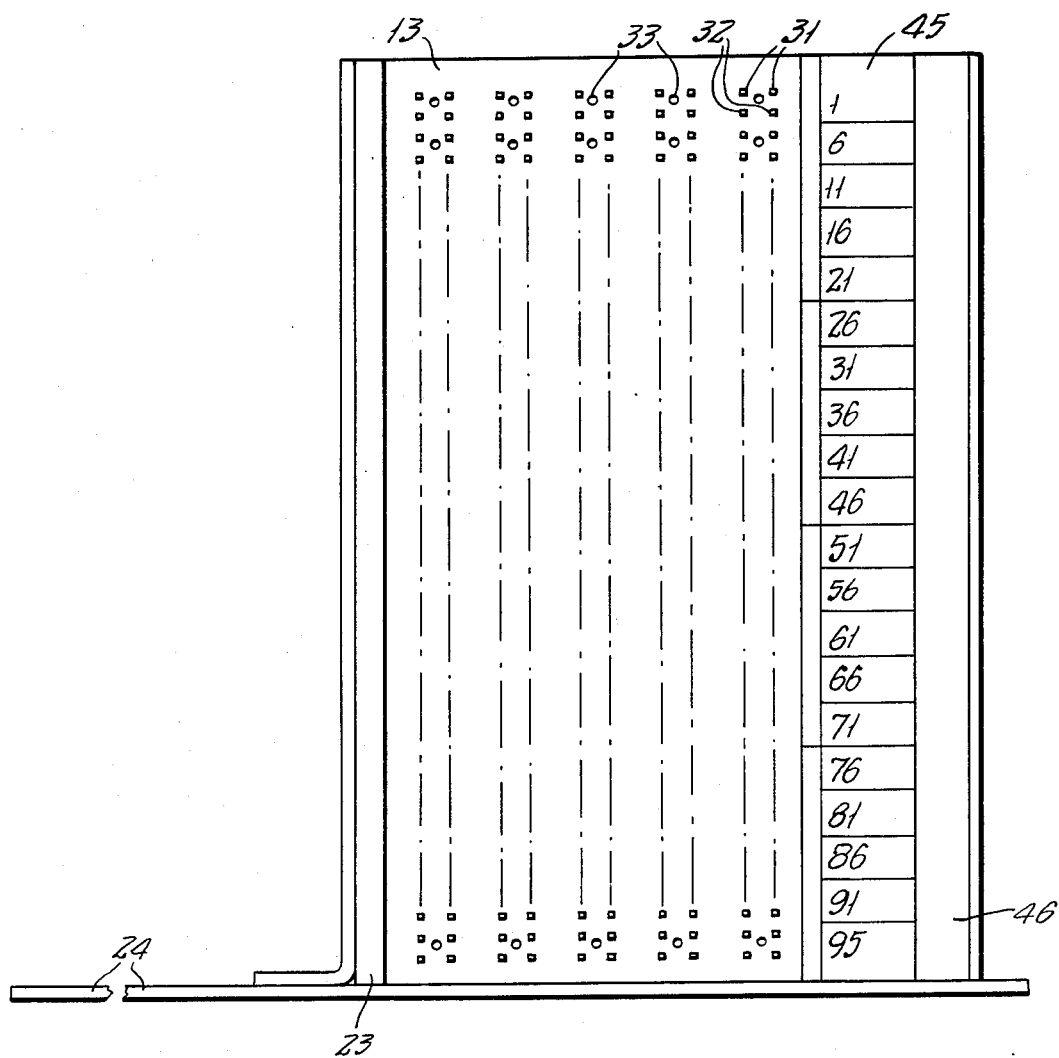
FIG. 3 is a fragmentary enlarged side elevational view thereof, corresponding to the upper portion of FIG. 2.
Figure 4:
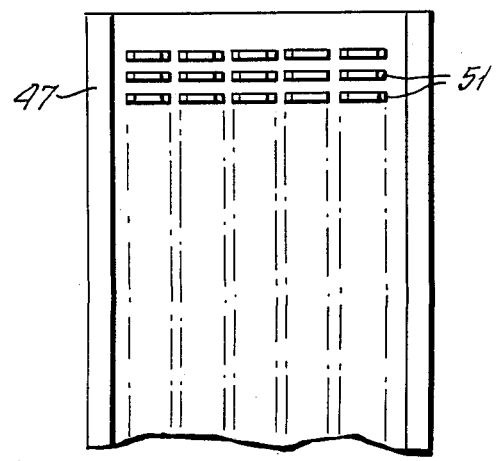
FIG. 4 is a fragmentary front elevational view thereof.

In accordance with the invention, the device, generally indicated by reference character 10, comprises broadly: a longitudinally extending intermediate wall 12, a tranversely extending front wall 13, and a transversely extending rear wall 14.

The intermediate wall 12 is of hollow construction, and includes first and second wall members 21 and 22, as well as an end wall segment 23 which supports a mounting bracket 24 of generally "L" shaped configuration. The wall member 21 includes an outer surface 26 from which the wire wrap pins 27 extend for the interconnection of subscriber pairs. These are disposed in pairs in individual areas generally indicated by reference character 28.

Referring to FIG. 1, the second wall member 22 includes an outer surface 29 defining corresponding areas 30 upon which protector modules (not shown) are mounted. Each area includes a pair of outside plant pins 31 and a pair of central office pins 32 as well as a recess 33 for the interconnection with a ground pin (not shown) forming a part of the protector module.

The front wall 13 is preferably formed as an injection molding from synthetic resinous materials, and is secured by bolts 38 to the wall 12. A main body portion 39 includes an inner surface 40 and an outer surface 41. A first end 42 supports a fanning strip 43, while a second end supports a marker strip 45 and flange 46 having a forwardly facing surface 47 with circuit identifying indicia. First and second hollow recesses 48 and 49 expose the stem portions 50 of a plurality of quick clips 51 embedded in corresponding slots in the body portion 39, the quick clips preferably having pairs of wire insulation displacement slots 52. As the quick clip structure is well known in the art, the details of the same are outside the scope of the present disclosure The rear wall 14 comprises an intergrally molded member bounded by an inner surface 61 an outer surface 62, and end surfaces 63 and 64. The end adjacent the surface 64 defines a shoulder 65.

A protective cover 66 is preferably formed of transparent synthetic resinous material, and includes a first edge 67 and an oppositely disposed second edge 68, the latter being disposed in a recess 69 in the wall 13 which faces the shoulder 65, this structure permitting the cover to be removed in a vertical direction when desired.

It will be apparent, from a consideration of FIG. 1 in the drawing, that the transversly extending front wall determines the maximum width of the block, and permits the forming of recesses in which the wire wrap pins and protector modules may be disposed. As a consequence, a protector block of relatively small overall configuration offers a relatively large usable area for wire interconnection. In preferred form, a block accommodating one hundred subscriber pairs need by only six inches deep, three and one quarter inches wide, and nine inches high. Since no connections are in the upper and lower surfaces thereof, the blocks may be conveniently stacked to any desired height.

What is claimed is:

1. An improved high density protector block having a generally "T" shaped horizontal cross-section comprising: a longitudinally extending intermediate wall (12), a transversely extending front wall (13), a transversely extending rear wall (14), and a protective cover (66); said longitudinally extending wall being of hollow construction and having first and second wall members (21) (22), and an end wall segment (23), a mounting bracket (24) supported by said transversely extending rear wall (14); said first wall member (21) having an outer surface (26) and wire wrap pins (27) extending therefrom for the interconnection of subscriber pairs, said pins being disposed in individual areas (28); said second wall member (22) having an outer surface (29) defining corresponding areas (30) for the mounting of protector modules; said transversely extending front wall (13) having an inner surface (40), secured to said intermediate wall (12) and an outer surface (41) mounting a plurality of quick clips (51) communicating with said corresponding areas (30); the transversely extending front wall (13) defining a rearwardly extending recess (69), said transversely extending rear wall (14) being secured to said intermediate wall (12) at an inner end thereof; a forwardly facing surface of said rear wall (14) defining a shoulder (65) disposed opposite said recess (69), said cover (66) slidably positioned to engage said recess (69) and shoulder (65) to overlie the ends of said wire wrap pins (27).

* * * * *